(12) United States Patent
Goedel et al.

(10) Patent No.: US 12,717,007 B2
(45) Date of Patent: Aug. 25, 2026

(54) COMPUTER UNIT FOR A LIDAR DEVICE, AND LIDAR DEVICE

(71) Applicant: Robert Bosch GmbH, Stuttgart (DE)

(72) Inventors: Karl Christoph Goedel, Vaihingen an der Enz (DE); Holger Maris Gilbergs, Sersheim (DE); Johannes Richter, Ludwigsburg (DE); Axel Fink, Tuebingen (DE); Florian Mauch, Talheim (DE); Norman Haag, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1004 days.

(21) Appl. No.: 17/906,276

(22) PCT Filed: Jun. 29, 2021

(86) PCT No.: PCT/EP2021/067887
§ 371 (c)(1),
(2) Date: Sep. 14, 2022

(87) PCT Pub. No.: WO2022/002962
PCT Pub. Date: Jan. 6, 2022

(65) Prior Publication Data

US 2023/0092128 A1 Mar. 23, 2023

(30) Foreign Application Priority Data

Jun. 30, 2020 (DE) ..................... 10 2020 208 093.3

(51) Int. Cl.
*G01S 7/487* (2006.01)
*G01S 7/4865* (2020.01)
(Continued)

(52) U.S. Cl.
CPC .......... *G01S 7/4876* (2013.01); *G01S 7/4865* (2013.01); *G01S 7/4913* (2013.01); *G01S 17/89* (2013.01); *G01S 17/931* (2020.01)

(58) Field of Classification Search
CPC ............................ G01S 7/4802; G01S 7/4876
See application file for complete search history.

(56) References Cited

U.S. PATENT DOCUMENTS

2006/0210113 A1* 9/2006 Fujioka ................. G01S 13/867 382/104
2016/0011313 A1* 1/2016 Rousseau ............. G01S 7/4816 356/5.01

(Continued)

FOREIGN PATENT DOCUMENTS

CN 108279407 A 7/2018
CN 109581399 A 4/2019

(Continued)

OTHER PUBLICATIONS

International Search Report for PCT/EP2021/067887, Issued Sep. 14, 2021.

(Continued)

*Primary Examiner* — Christopher D Hutchens
(74) *Attorney, Agent, or Firm* — NORTON ROSE FULBRIGHT US LLP

(57) ABSTRACT

A computer unit for a LiDAR device, which has a laser source configured to emit a laser signal into a transmit path, and a LiDAR sensor arranged in a receive path and configured to detect a laser signal reflected into the receive path. The computer unit is configured to process a multiplicity of laser signal data points of the reflected laser signal. The computer unit is configured to filter halation out of the laser signal data points of the reflected laser signal.

15 Claims, 4 Drawing Sheets

(51) Int. Cl.

| | |
|---|---|
| ***G01S 7/4913*** | (2020.01) |
| ***G01S 17/89*** | (2020.01) |
| ***G01S 17/931*** | (2020.01) |

(56) References Cited

U.S. PATENT DOCUMENTS

| | | | | |
|---|---|---|---|---|
| 2016/0252617 | A1* | 9/2016 | Tehrani Niknejad | G01S 7/4808 356/5.01 |
| 2017/0234976 | A1 | 8/2017 | Grauer et al. | |
| 2018/0120857 | A1* | 5/2018 | Kappauf | G01S 17/931 |
| 2018/0211119 | A1* | 7/2018 | Liu | B60W 10/04 |
| 2019/0293770 | A1* | 9/2019 | Subasingha | G01S 7/4865 |
| 2019/0295231 | A1 | 9/2019 | Zhao et al. | |
| 2019/0391270 | A1* | 12/2019 | Uehara | G01S 17/04 |
| 2020/0041652 | A1 | 2/2020 | Jain et al. | |
| 2022/0137218 | A1* | 5/2022 | Onal | G01N 21/359 356/4.01 |
| 2022/0276164 | A1* | 9/2022 | Aceti | G01S 7/4815 |

FOREIGN PATENT DOCUMENTS

| | | | |
|---|---|---|---|
| CN | 110031823 | A | 7/2019 |
| DE | 102019005583 | A1 | 3/2020 |

OTHER PUBLICATIONS

Zhang He: "Target Detection and Recognition," Technology Edition Beijing Institute of Technology Press, (2005), selected pp. 1-12, with English Abstract.

* cited by examiner

COMPUTER UNIT FOR A LIDAR DEVICE, AND LIDAR DEVICE

FIELD

The present invention relates to a computer unit for a LiDAR device, which has a laser source configured to emit a laser signal into a transmit path, and a LiDAR sensor arranged in a receive path and configured to detect a laser signal reflected into the receive path, and the computer unit being configured to process a multiplicity of laser signal data points of the reflected laser signal. The present invention further relates to a LiDAR device comprising a computer unit of this kind.

BACKGROUND INFORMATION

The number of motor vehicles with high or full automation (levels 3-5) on the road will increase over the next few years. All conventional concepts of autonomous motor vehicles require a combination of different sensor concepts, for example camera, radar, or LiDAR sensor concepts. LiDAR sensor concepts may be implemented using a LiDAR device. This LiDAR device has a laser source that emits a laser signal into a transmit path. Said laser signal is reflected on objects in the surroundings of the LiDAR device. The reflected laser signal impinges on the LiDAR device again, where it is conducted into a receive path. A LiDAR sensor is arranged in the receive path and detects the reflected laser signal. The LiDAR sensor then calculates how far away the object is from the LiDAR device using the measured time-of-flight difference. The object and its position are encoded in the multiplicity of laser signal data points of the reflected laser signal. If the object is highly reflective, and in particular retroreflective, crosstalk with adjacent laser signal data points may occur. This is referred to as halation ("blooming"). Halation of this kind is, for example, visible in the laser signal data points that are allocated to a retroreflective traffic sign.

In this case, halation is particularly pronounced in LiDAR devices having parallelized measurement, such as flash LiDAR, vertical flash LiDAR, or horizontal flash LiDAR. However, it may also occur in LiDAR devices that do not operate using parallelized measurement. This is the case in particular if a medium that scatters light is arranged in the receive path. This medium may, for example, be raindrops or scratches on a glass cover.

Halation distorts the measurement of the LiDAR device. It therefore has the potential to jeopardize the safety of a motor vehicle driving autonomously. For instance, halation causes the size of objects in the surroundings of the LiDAR device to be overestimated. Depending on the architecture of the LiDAR sensor, various critical scenarios may then occur as regards the driving safety of a vehicle driving autonomously. For example, if the halation is predominantly vertical, then it may be more difficult, for example, to recognize gantries (structures that span the roadway and bear traffic signs above the roadway). Since the size of the gantry may be overestimated due to halation, the gantry may be detected as a "wall" on the roadway. In some circumstances, a detection of this kind would trigger emergency braking in the autonomously driving motor vehicle. For road safety reasons, this has to be avoided. At the same time, however, it has to be possible to detect objects that are located below the gantry and potentially blocking the roadway.

SUMMARY

According to the present invention, a computer unit is provided which is configured to filter halation out of the laser signal data points of the reflected laser signal.

An advantage of the computer unit according to the present invention is that halation can now be filtered out of the laser signal data points of the reflected laser signal. At the same time, the laser signal data points of the reflected laser signal that are able to be allocated to a real object are also retained thereby. As a result, real objects can be identified in a halation region. This is simple to do. In this way, the problem of halation on gantries may be solved, for example. The gantries can be reliably identified as such. At the same time, it is then also possible to identify that objects located below the gantry are real objects.

In addition, according to an example embodiment of the present invention, it is possible for the computer unit to be configured to identify the laser signal data points that are allocated to a retroreflector.

According to an example embodiment of the present invention, a first step in identifying a halation region in the laser signal data points is to identify laser signal data points that can be allocated to a retroreflector. Halation occurs more frequently with these retroreflectors, or highly reflective objects, in particular. In the process, crosstalk with adjacent laser signal data points occurs, making it more difficult to reliably recognize real objects. To be able to reliably detect and remedy this effect, it is crucial to precisely determine the laser signal data points that can be allocated to a retroreflector.

In a particular specific example embodiment of the present invention, the computer unit is configured to

- calculate a reflectance of each of the laser signal data points, preferably using the intensity level thereof;
- compare the calculated reflectance of each laser signal data point with a predetermined reflectance threshold;
- allocate the laser signal data points to a retroreflector if the calculated reflectance is greater than the predetermined reflectance threshold.

An explicit algorithm for determining the laser signal data points that can be allocated to a retroreflector is therefore specified. For this purpose, according to an example embodiment of the present invention, the intensity level of the reflected laser signal is analyzed. In the process, it is initially assumed that a real object larger than one pixel of the laser signal data points is present. The intensity level $P_{receive}$ then measured at the LiDAR sensor is proportional to $P_{receive} \sim P_{transmit} R/r^2$, where $P_{transmit}$ denotes the emitted laser power, R denotes the reflectance of the real object, and r denotes the distance between the LiDAR sensor and the real object. Therefore, the expression $P_{receive} r^2/P_{transmit}$ is proportional to the reflectance. For each laser signal data point, the reflectance can then be calculated from the intensity level. This calculated value is compared with a predetermined reflectance threshold. This may be the reflectance value that is expected from a 100%-reflective Lambertian target. In this context, retroreflectors have the unique property whereby their apparent Lambertian reflectance is much higher than 100%. Typically, values between 1,000% and 100,000% are reached for the reflectance in these cases. All the laser signal data points that have a reflectance much higher than 100% are therefore identified as retroreflectors.

Alternatively, according to an example embodiment of the present invention, the computer unit is advantageously configured to identify specific laser signal data points that are located in the same laser signal data point plane as the laser signal data points allocated to the retroreflector and are at the same distance from the LiDAR device as the laser signal data points allocated to the retroreflector.

This identification of specific laser signal data points takes place after the laser signal data points allocated to a retroreflector have been identified. In the process, a laser signal data point plane may be located in the horizontal and/or the vertical. As mentioned, all of these laser signal data points in the surroundings of a retroreflector are in particular to be considered halation candidates. At the same time, the laser signal data points that are at the same distance from the LiDAR device as the laser signal data points allocated to the retroreflector are also selected. A real object that is located close to the retroreflector may be encoded in these laser signal data points. A real object of this kind has to be able to be reliably identified.

Furthermore, according to an example embodiment of the present invention, it is very advantageous for the computer unit to be configured to

- determine an intensity level of the specific laser signal data points;
- compare the determined intensity level of each laser signal data point with a predetermined intensity level threshold;
- allocate the specific laser signal data points to a real object if the determined intensity level is greater than the predetermined intensity level threshold and/or if the determined intensity level has a discontinuous curve.

An explicit algorithm for determining the specific laser signal data points that can be allocated to a real object is therefore specified. For this purpose, according to an example embodiment of the present invention, the intensity level of the specific laser signal data points is determined. This can be done, for example, in the horizontal or vertical. In the process, the intensity level of laser signal data points that can be allocated to halation is expected to be outside the range of the retroreflector (for example above and below for a horizontal analysis, or to the right and left for a vertical analysis). This behavior of an intensity level drop is typical for halation since the halation is reduced as the distance between the laser signal data point and the retroreflector increases. Therefore, if the laser signal data points are allocated to a real object, discontinuity in the intensity level is expected. Discontinuity of this kind cannot occur in halation. All the laser signal data points exhibiting discontinuous behavior in their intensity level can thus be allocated to a real object. This process can be used particularly reliably in LiDAR sensors that determine the intensity level as an integral of the reflected laser signal over time.

According to a preferred specific embodiment of the present invention, the computer unit is configured to

- determine an echo duration of the specific laser signal data points;
- compare the determined echo duration with a predetermined echo duration threshold;
- allocate the specific laser signal data points to a real object if the determined echo duration is greater than the predetermined echo duration threshold.

In this way too, an explicit algorithm for determining the specific laser signal data points that can be allocated to a real object is specified. For this purpose, according to an example embodiment of the present invention, the echo duration of the specific laser signal data points is determined. This can be used in particular to identify real objects located in the vicinity of a retroreflector. A distinction can be drawn between three different configurations in this respect. If the distance between the real object and the retroreflector is greater than the echo duration of the associated reflected laser signal, two separate laser signal data points will be expected in the specific laser signal data points. If the distance between the object and the retroreflector is less than the echo duration of the associated laser signal, just one laser signal data point will be expected in the specific laser signal data points. However, this laser signal data point then constitutes a superposition of the laser signal data point related to the real object and the laser signal data point related to the retroreflector. The corresponding laser signal data point will thus have a higher echo duration that is greater than the echo duration of an individual reflected laser signal of the real object or of the retroreflector. Lastly, a third case may occur in which the distance between the real object and the retroreflector is identical. In this case too, just one laser signal data point will be expected in the specific laser signal data points. However, this laser signal data point too constitutes a superposition of the laser signal data point related to the real object and the laser signal data point related to the retroreflector. Here too, a greater echo duration than in the case of separate laser signal data points will therefore be expected. In this case, however, an increase in the peak intensity level of the corresponding laser signal data point will also occur in particular, owing to the superposition. As described above, this intensity level may in turn be used for identifying the real object.

In addition, according to an example embodiment of the present invention, it is advantageous for the computer unit to be configured to identify, out of the multiplicity of laser signal data points, the specific laser signal data points that are not allocated to a real object as being halation laser signal data points and to filter them out.

This step is performed by filtering, out of the laser signal data points, all the specific laser signal data points that exhibit the behavior expected of halation in terms of their intensity level and have an echo duration that is equal to the echo duration of the reflected laser signal. These laser signal data points are identified as halation laser signal data points. At the same time, the specific laser signal data points exhibiting discontinuous behavior in their intensity level, out of the multiplicity of laser signal data points, are retained. In the process, in one specific embodiment of the invention, the decrease in the intensity level as the distance between the laser signal data point and the retroreflector increases may also be fitted using a suitable function. This can, for example, be an exponential function. The reduced square of this fit can then give an insight into whether real objects are potentially present in the halation laser signal data points. In addition, the fitted function may be subtracted from the values of the intensity level, and all the laser signal data points having a residual intensity level above a certain intensity level threshold can be allocated to a real object.

According to an example embodiment of the present invention, it is also advantageous for the computer unit to be configured to determine the probability that laser signal data points allocated to a real object are present in the halation laser signal data points.

This can even be done when laser signal data points have been identified as halation laser signal data points. For this purpose, the noise of each halation laser signal data point is estimated using the underlying statistical behavior of the LiDAR sensor. In particular, a Poisson distribution is assumed, in which noise~$(\text{intensity})^{1/2}$. The LiDAR sensor can then specify a probability that targets having a different reflectance are present at the location of the halation laser signal data points. For this purpose, the different sigmas of a normal distribution are used. This self-evaluation provides a robust process that can be adapted to different environmental conditions in which halation may occur more frequently, for example raindrops on a glass cover.

According to an example embodiment of the present invention, a LiDAR device comprising a computer unit of this kind is advantageously provided.

A LiDAR device that can make use of the aforementioned advantages of the computer unit according to the present invention can thus be provided. In this context, it is particularly advantageous that the computer unit can be used for different LiDAR devices. By way of example, some LiDAR devices use LiDAR sensors that determine the intensity level as the peak signal of the reflected laser signal. Other LiDAR sensors, by contrast, use the integral of the laser signal over time instead. The computer unit disclosed here according to the present invention is equally suitable for both types of LiDAR sensor.

Advantageous developments of the present invention are disclosed here.

BRIEF DESCRIPTION OF THE DRAWINGS

Exemplary embodiments of the present invention will be explained in more detail on the basis of the following description and the figures.

DETAILED DESCRIPTION OF EXAMPLE EMBODIMENTS

The present invention relates to a computer unit for a LiDAR device, which has a laser source configured to emit a laser signal into a transmit path, and a LiDAR sensor arranged in a receive path and configured to detect a laser signal reflected into the receive path, and the computer unit being configured to process a multiplicity of laser signal data points 4 of the reflected laser signal. In this case, a laser signal is emitted using the laser source. Said laser signal is reflected on objects in the surroundings of the LiDAR device. The reflected laser signal is detected in the receive path of the LiDAR device by way of the LiDAR sensor. A multiplicity of laser signal data points 4 mapping the surroundings of the LiDAR device are ascertained from said detected reflected laser signal.

Figure 1A:
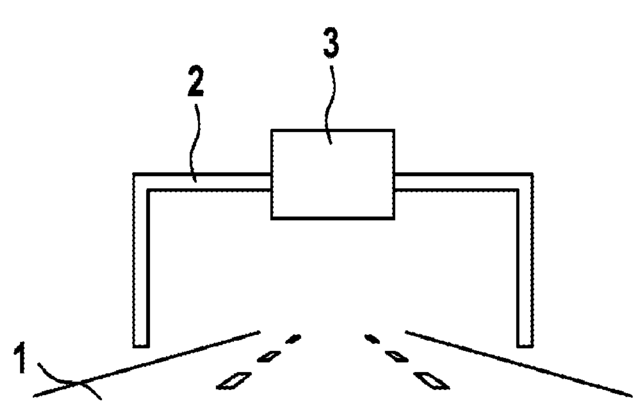
FIG. 1A is a first front view of a roadway comprising a traffic sign mounted on a gantry.

FIG. 1A shows surroundings of the LiDAR device. These surroundings include a roadway 1 comprising a gantry 2 on which a traffic sign 3 is mounted.

Figure 1B:
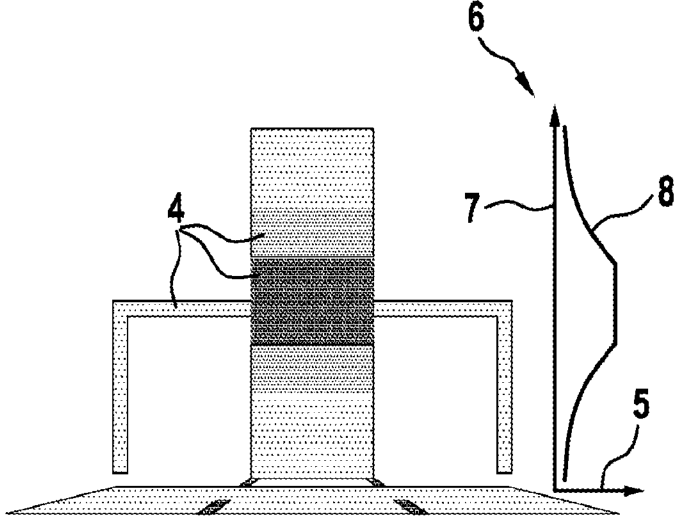
FIG. 1B is a first front view of a multiplicity of laser signal data points that encode the view from FIG. 1A.

FIG. 1B then shows the image of said surroundings from FIG. 1A by way of the multiplicity of laser signal data points 4. Each of said laser signal data points 4 has an intensity level 5 that is specified by way of a color code of the different laser signal data points 4. The darker a laser signal data point 4, the higher its associated intensity level 5. This relationship is likewise illustrated in the graph 6. On the horizontal axis, the intensity level 5 is plotted against the height 7. This results in a function 8 of the height 7 depending on the intensity level 5.

In FIG. 1B, it can also be seen that the size of the traffic sign 3 is overestimated in the image in the vertical by way of the laser signal data points 4. This is caused by "halation," which is crosstalk with adjacent laser signal data points 4. It can be particularly pronounced in highly reflective or retroreflective objects such as a traffic sign 3. As can also be seen in FIG. 1B, the traffic sign 3 appears in the image as a wall on the roadway 1, so to speak, as a result of the laser signal data points 4. However, this erroneous depiction owing to halation is dangerous in terms of the road safety of motor vehicles driving autonomously on the roadway 1. For instance, an autonomously driving motor vehicle would have to trigger emergency braking in view of a "wall" on the roadway 1. This "false" reaction jeopardizes road safety and has to be avoided.

Figure 2A:
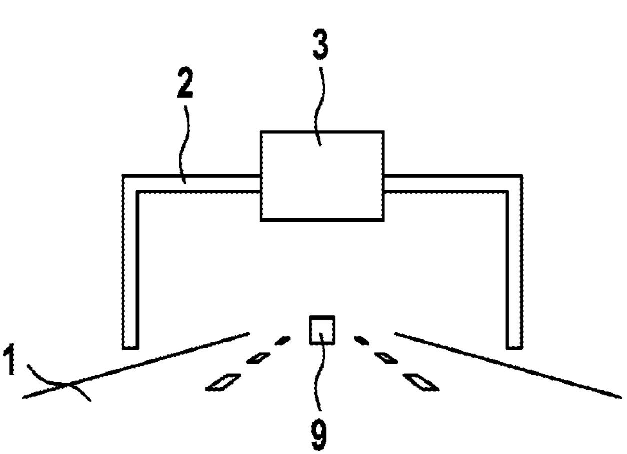
FIG. 2A is a second front view of the roadway comprising the traffic sign mounted on the gantry, with a real object arranged below the traffic sign.

Another potential road safety hazard is illustrated in FIG. 2A. The roadway 1 having the gantry 2 and the traffic sign 3 is shown again. Now, though, a real object 9 is arranged on the roadway 1 below the traffic sign 3. This real object 9 may pose a risk to a vehicle driving autonomously. The autonomously driving vehicle may have to avoid the object 9 in some circumstances. For this purpose, though, the real object 9 also has to be reliably identified in the laser signal data points 4.

Figure 2B:
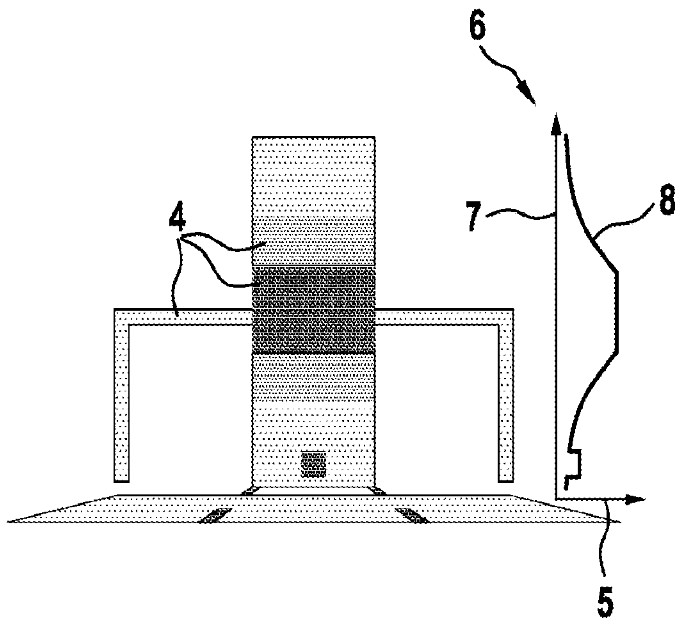
FIG. 2B is a second front view of the multiplicity of laser signal data points that encode the view from FIG. 2A.

In particular, however, it can be seen in FIG. 2B that a real object 9 arranged below the traffic sign 3 (i.e., close to a retroreflector) may in some circumstances fall into the region of the halation in the laser signal data points 4. This poses the risk that the real object 9 will no longer be recognized in the halation. A graph 6 again shows the relationship between the height 7 and the intensity level 5. The associated function 8 shows a small plateau, corresponding to the real object 9, when the values for the height 7 are low.

In sum, therefore, there is a need both to eliminate halation (in particular in retroreflectors) and, at the same time, to retain the laser signal data points 4 that can be allocated to a real object 9 (in the halation region).

Figure 3A:
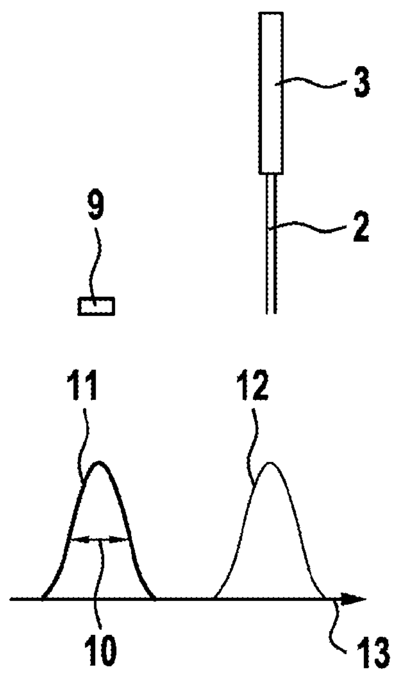
FIG. 3A is a side view of the roadway comprising the traffic sign and the real object from FIG. 2A, with a time-resolved intensity level distribution of the associated laser signal data points in a first configuration.
Figure 3B:
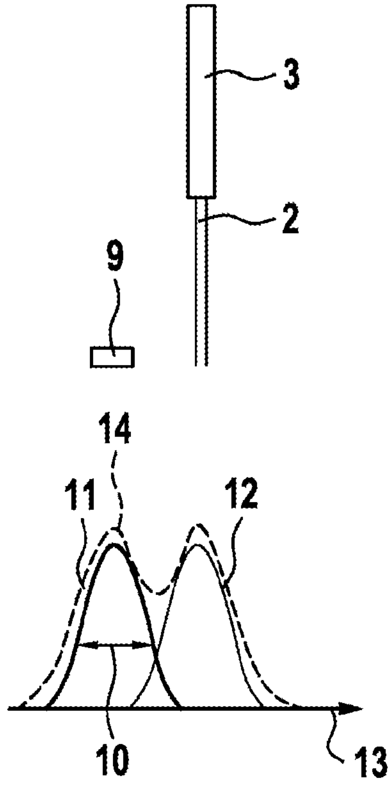
FIG. 3B is a side view of the roadway comprising the traffic sign and the real object from FIG. 2A, with a time-resolved intensity level distribution of the associated laser signal data points in a second configuration.
Figure 3C:
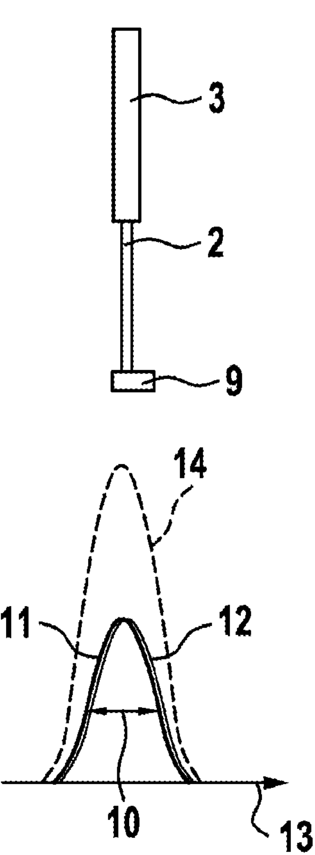
FIG. 3C is a side view of the roadway comprising the traffic sign and the real object from FIG. 2A, with a time-resolved intensity level distribution of the associated laser signal data points in a third configuration.

The computer unit according to the present invention is now configured to filter halation out of the laser signal data points 4 of the reflected laser signal. How this can be done will be described below in relation to FIG. 3A-3C.

In a first step, the laser signal data points 4 that correspond to a retroreflector (traffic sign 3) are identified. This is done by analyzing the intensity level 5 of the reflected laser signal using the computer unit. It is initially assumed that a retroreflector is larger than one pixel in the laser signal data points 4. The intensity level 5 then measured using the LiDAR sensor is proportional to the emitted laser power, the reflectance of the retroreflector, and the square of the distance between the LiDAR sensor and the retroreflector. In other words, the reflectance of the retroreflector can then be deduced from the measured intensity level 5. The reflectance of the retroreflector is calculated accordingly for each laser signal data point 4 using the computer unit. The calculated value is then compared with the value expected from a 100%-reflective Lambertian target. Retroreflectors have the unique property whereby their apparent Lambertian reflectance is much higher than 100%. Typical values are between 1,000% and 100,000%. All the laser signal data points 4 having a reflectance much higher than 100% are therefore identified as retroreflectors.

In a second step, all the specific laser signal data points 4 located in the same laser signal data point plane as the retroreflector are identified. In addition, all the specific laser signal data points 4 that are at the same distance from the LiDAR sensor as the laser signal data points 4 allocated to the retroreflector are identified. All these specific laser signal data points 4 are halation candidates. Three different cases may now occur.

In a first case (in FIG. 3A), an echo duration 10 of the reflected laser signal is greater than a distance between the real object 9 and the traffic sign 3. The figure shows the intensity level distribution 11 of the real object 9 and the intensity level distribution 12 of the traffic sign 3 as a function of time 13. In this case, the distance between the intensity level distribution 11 of the real object 9 and the intensity level distribution 12 of the traffic sign 3 is greater than the echo duration 10. Two separate laser signal data points 4 are detected.

In a second case (in FIG. 3B), the distance between the real object 9 and the traffic sign 3 is less than an echo duration 10 of the reflected laser signal. The figure shows the intensity level distribution 11 of the real object 9 and the intensity level distribution 12 of the traffic sign 3 as a function of time 13. In this case, the distance between the intensity level distribution 11 of the real object 9 and the intensity level distribution 12 of the traffic sign 3 is less than the echo duration 10. A single laser signal data point 4 is detected. However, this laser signal data point 4 has a greater echo duration than that of the intensity level distribution 11 of the real object 9 and that of the intensity level distribution 12 of the traffic sign 3. A superposed intensity level distribution 14 is measured.

In a third case (in FIG. 3C), the real object 9 and the traffic sign 3 are at the same distance from the LiDAR device. A single laser signal data point 4 is detected. However, this laser signal data point 4 has a greater peak intensity level than that of the intensity level distribution 11 of the real object 9 and that of the intensity level distribution 12 of the traffic sign 3. A superposed intensity level distribution 14 is measured.

The two parameters of echo duration 10 and intensity level distribution 11, 12 thus allow real objects 9 below the traffic sign 3 to be identified. In this case, it is also possible to take advantage of the fact that laser signal data points 4 for halation exhibit behavior as illustrated in FIGS. 1B and 2B. In this case, the intensity level 5 for laser signal data points 4 of this kind drops in the vertical starting from the traffic sign 3. This is exemplified in the function 8. This behavior is typical of halation since halation is reduced as the distance from the retroreflector increases. Real objects 9 do not exhibit this kind of behavior. In this case, discontinuous behavior is expected in the intensity level 5. As a result, halation can be identified.

In a third step, all the laser signal data points 4 that exhibit the behavior in terms of intensity level 5 that is typical of halation and those that have an echo duration equal to that of the reflected laser signal can then be filtered out. All the laser signal data points 4 having a discontinuous intensity level distribution are retained.

Although the present invention has been illustrated and described in more detail using preferred exemplary embodiments, the present invention is not limited to the disclosed examples and a person skilled in the art may derive other variations therefrom without departing from the scope of the present invention.

What is claimed is:

1. A computer unit for a LiDAR device, the LiDAR device having a laser source configured to emit a laser signal into a transmit path and a LiDAR sensor arranged in a receive path and configured to detect a reflected laser signal that is reflected into the receive path, the computer unit configured to:

determine, for each of a multiplicity of laser signal data points of the reflected laser signal, a reflectance value;

identify, based on comparing the reflectance value for each of the laser signal data points with a reflectance threshold corresponding to a Lambertian surface, one or more of the multiplicity of laser signal data points as belonging to a retroreflector;

identify, based on the identified retroreflector, a halation candidate subset of the multiplicity of laser signal data points that are located in a same laser signal data point plane as the retroreflector and are associated with a same distance from the LiDAR sensor as the retroreflector;

determine, for the halation candidate subset one or both of:

(a) an intensity-level discontinuity along the laser signal data point plane; and (b) an echo duration corresponding to the respective laser signal data points of the halation candidate subset;

allocate, based on the one or both of the intensity-level discontinuity and the echo duration, a first portion of the halation candidate subset to an object located proximate to the retroreflector, and allocate a second portion of the halation candidate subset to halation caused by the retroreflector; and filter the multiplicity of laser signal data points by removing the second portion allocated to halation from a representation of the multiplicity of laser signal data points of the reflected laser signal while retaining the first portion allocated to the object.

2. The computer unit as recited in claim 1, wherein the computer unit is configured to determine a probability of object presence within the halation region.

3. The computer unit as recited in claim 1, wherein the determination of the reflectance value is based at least on an intensity of the respective laser signal data point, a distance associated with the respective laser signal data point, and an emitted laser power of the laser source.

4. The computer unit as recited in claim 1, wherein the reflectance value is computed as an estimate of Lambertian reflectance.

5. The computer unit as recited in claim 1, wherein the reflectance threshold corresponds to a Lambertian surface having 100% Lambertian reflectance, and wherein the retroreflector is identified by determining that the reflectance value exceeds 100%.

6. The computer unit as recited in claim 1, wherein the halation candidate subset includes laser signal data points falling within a range interval corresponding to the distance of the retroreflector and within a horizontal or vertical plane corresponding to the laser signal data point plane.

7. The computer unit as recited in claim 1, wherein determining the echo duration includes determining a duration of a waveform returned in response to the emitted laser signal.

8. The computer unit as recited in claim 7, wherein the computer unit compares a signal profile including a characteristic of the determined echo duration with a predefined signal profile that includes a predefined echo-duration behavior, and allocates a laser signal data point to the object based on a result of the comparison.

9. The computer unit as recited in claim 8, wherein a merged return caused by reflections from the retroreflector and the object is determined based on the echo duration being longer than an echo duration determined as being associated with the halation caused by the retroreflector alone.

10. The computer unit as recited in claim 1, wherein filtering the multiplicity of laser signal data points includes generating a filtered representation of the reflected laser signal that excludes the halation-allocated laser signal data points while retaining the object-allocated laser signal data points.

11. The computer unit as recited in claim 1, wherein the intensity-level discontinuity is determined by detecting a non-smooth change in the intensity values along the laser signal data point plane, presence of the object, distinct from the halation, being determined based on the non-smooth change.

12. The computer unit as recited in claim 1, wherein the allocation is based on the intensity-level discontinuity.

13. The computer unit as recited in claim 12, wherein the allocation is further based on the echo duration.

14. The computer unit as recited in claim 1, wherein the allocation is based on the echo duration.

15. A LiDAR device, comprising:

a laser source configured to emit a laser signal into a transmit path;

a LiDAR sensor arranged in a receive path and configured to detect a reflected laser signal that is reflected into the receive path; and a computer unit configured to:

determine, for each of a multiplicity of laser signal data points of the reflected laser signal, a reflectance value;

identify, based on comparing the reflectance value for each of the laser signal data points with a reflectance threshold corresponding to a Lambertian surface, one or more of the multiplicity of laser signal data points as belonging to a retroreflector;

identify, based on the identified retroreflector, a halation candidate subset of the multiplicity of laser signal data points that are located in a same laser signal data point plane as the retroreflector and are associated with a same distance from the LiDAR sensor as the retroreflector;

determine, for the halation candidate subset one or both of:

(a) an intensity-level discontinuity along the laser signal data point plane; and (b) an echo duration corresponding to the respective laser signal data points of the halation candidate subset;

allocate, based on the one or both of the intensity-level discontinuity and the echo duration, a first portion of the halation candidate subset to an object located proximate to the retroreflector, and allocate a second portion of the halation candidate subset to halation caused by the retroreflector; and filter the multiplicity of laser signal data points by removing the second portion allocated to halation from a representation of the multiplicity of laser signal data points of the reflected laser signal while retaining the first portion allocated to the object.

* * * * *